United States Patent

Johnson

[11] 3,893,813
[45] July 8, 1975

[54] LABORATORY CLAMP

[75] Inventor: Arthur F. Johnson, Northbrook, Ill.

[73] Assignee: Humboldt Manufacturing Company, Norridge, Ill.

[22] Filed: Oct. 26, 1973

[21] Appl. No.: 409,929

[52] U.S. Cl. .......... 23/292; 24/243 LC; 24/248 SA; 24/254; 81/116; 269/234
[51] Int. Cl. ........................... B01l 9/00; B25b 5/04
[58] Field of Search .... 23/292; 24/243 LC, 248 SA, 24/249 LS, 254; 269/229, 234, 238, 256, 218; 81/111, 112, 113, 115, 116

[56] References Cited
UNITED STATES PATENTS

| | | | |
|---|---|---|---|
| 1,519,067 | 12/1924 | Smith | 81/116 |
| 2,269,790 | 1/1942 | Sherrill | 24/254 |
| 2,850,926 | 9/1958 | Jobe | 269/234 |
| 2,915,096 | 12/1959 | Mooney | 269/218 |
| 2,989,337 | 6/1961 | Pispisa | 269/234 |

Primary Examiner—Joseph Scovronek
Assistant Examiner—Dale Lovercheck
Attorney, Agent, or Firm—Callard Livingston

[57] ABSTRACT

An adjustable laboratory clamp of the "universal" type suitable for use with burettes, flasks, test tubes and like laboratory glassware and apparatus. Structural configurations provide easily assembled components including a head structure providing a compartment to contain a jaw-actuating mechanism which are economically fabricated by die-casting methods. Parts of the clamp structure are integrally conformed with others. A simple rotary wedge means concealed within the head effects quick setting and release of the jaws.

8 Claims, 6 Drawing Figures

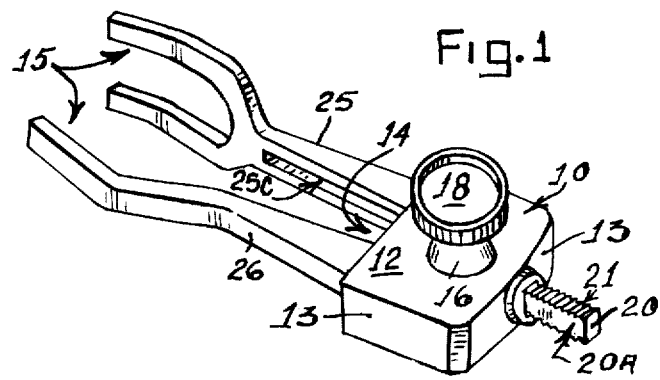
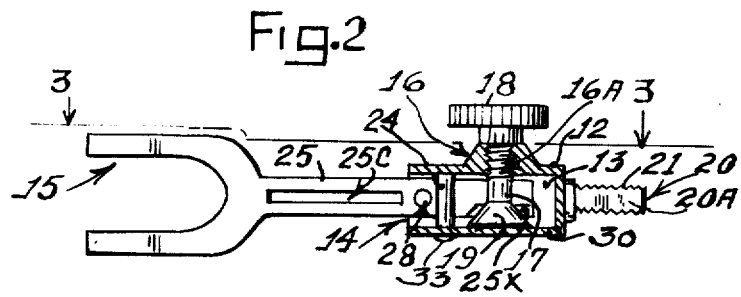
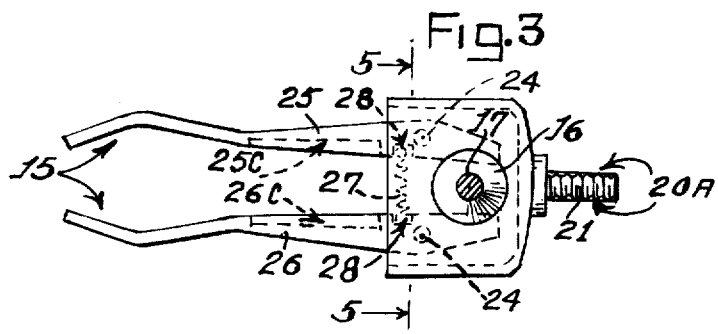
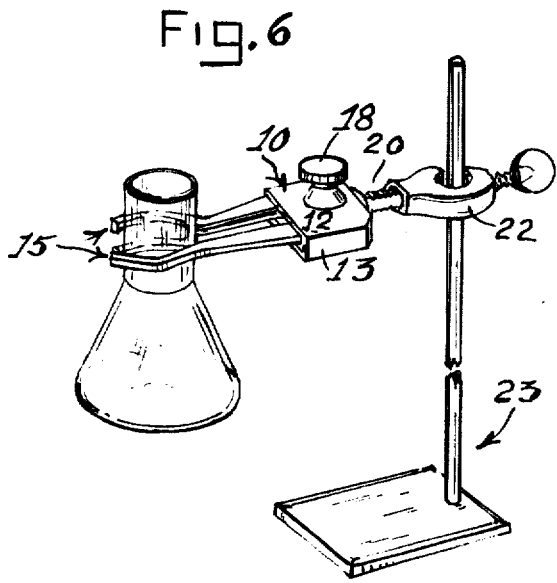
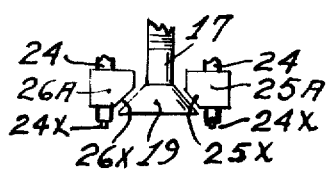
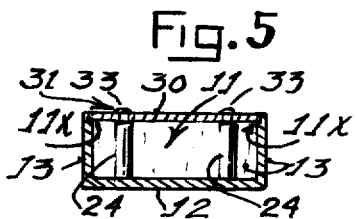

LABORATORY CLAMP

Conventional clamps of the "universal" class including the burette type commonly utilize poured body castings of both ferrous and non-ferrous metals which require machining and finishing operations; and where provided at all, the means for adjusting the jaws is usually a wing nut working on a slow thread with correspondingly slow jaw movement and manipulative convenience.

In accordance with the present improvements, the major components of the clamp structure include a head or body, tongs or legs, jaws, muff stud, which together with parts of the adjusting mechanism have configurations contrived to permit production by die-casting methods, and are also of a character permitting rapid assembly with few operations and minimal equipment.

According to the innovations disclosed, the ends of the tong arms are pivotally captured in the cavity of a die-cast housing or head structure to turn on posts which are integrally conformed as parts of the floor of the housing and also serve as partial support, as well as a fastening means, for a fitted closure plate completing the head structure and concealing the actuating mechanism.

Such a clamp has numerous uses in the laboratory and is accordingly designated as a "universal" type. The particular structural and functional innovations disclosed, in addition to providing operational and fabricating advantages, afford a distinctive streamlined appearance not characteristic of prior clamps of this type.

Spring means concealed within the housing normally urges the clamp jaws into diverged or releasing condition responsive to backing off of a relatively fast-acting frusto-conical closing wedge cooperative with the ends of the tong legs within the housing to effect firm seizure of the clamped object.

Additional features include a threaded muff mounting stud cast as an integrally-conformed part of the head structure, on the outer side of which there is also included a shaped integral protuberance tapped to provide a screwway for a spindle actuating said cam means.

The foregoing and other aspects of novelty, utility and advantageous fabricating features will be more fully understood as the following description of a preferred embodiment of the device proceeds in view of the annexed drawing in which:

FIG. 1 is a perspective view of the novel stand clamp;

FIG. 2 is a median sectional view with the bifurcated tong jaw and actuating cam shown in elevation;

FIG. 3 is essentially a top plan view of the clamp with a section taken through the actuating screw means along lines 3—3 of FIG. 2;

FIG. 4 is a fragmentary schematic detail illustrating the coaction between the actuating cam and tong legs;

FIG. 5 is a cross-sectional detail through the head casting and closure plate as it would be seen along lines 5—5 taken on FIG. 3;

FIG. 6 is a perspective view to reduced scale illustrative of the clamp in use.

As viewed in FIG. 1, the clamp comprises a die-cast head or body member 10, defined as cavitateous by reason of being hollow and affording a cavity, as indicated by the arrow 11 in FIG. 5, which is defined by a bottom wall 12 having integral surrounding side wall portions 13 interrupted as at 14 to provide a passage for the tong arms or legs 25, 26, said body being formed with the side thereof opposite said bottom wall 12 open to receive a closure member 30, FIG. 2, hereinafter further referred to.

On the outer side of the bottom wall is an enlarged and preferably conically shaped integrally-conformed protuberance 16 having a threaded bore 16A constituting a screwway in which a threaded tong-adjusting screw spindle 17 works, the outer end of this spindle being provided with a force-fitted knob 18, while the inner end thereof terminates in a frusto-conical wedge means 19 operative in rotative displacement to diverge the tong arms. The wedge means and its spindle are preferably die cast as an integrated unit, and the spindle is thereafter provided with a suitably flat full thread.

Formed as an integral part of the head casting at the crown thereof is a mounting stud 20 having opposite flat and thread-free faces 20A, while the intervening faces thereof are provided with die-cast threading 21 adapted to engage conventional clamp stand receptacles such as the muff 22 supporting the clamp and an engaged flask on the clamp stand 23, as in FIG. 6.

Interiorly of the head casting, as in FIGS. 4 and 5 are two integrally-conformed posts 24 constituting pivots for the ends 25A and 26A of the tong arms or legs which are remote from the tong jaws 15, each of said arms 25, 26 having its mass reduced by respective cavity formations 25C, 26C as in FIGS. 2 and 3. A spring 27, having opposite ends lodged in seating cavities 28 formed in the respective tong arms or legs, urges the latter and the jaws 15 thereof toward diverged or opening condition.

As viewed in FIGS. 2 and 4, portions of each leg or tong arm beyond the pivotal mounting thereof are chamfered as at 25X,26X to conform to the angle of the frusto-conical adjusting cam wedge 19, which will preferably be about 45°, such that as the spindle knob 18 is turned the wedge is helically displaced one way or the other to bear against or retreat from the chambered portions of the arms and accordingly close or open the tongs rapidly, using only a moderate pitch of thread helix on spindle 17 to effect full opening or closure with an average of approximately two turns of the knob 18.

The frusto-conical wedge and its shank may likewise be die-cast components, the desired screw threading being turned onto the shank as a separate operation.

The rim of the open top or face 11 of the cavitateous head casting is provided with a ledge 11X, FIG. 5, extending around three of the sides 13 thereof to interfit with and seat a closure plate 30, as in FIGS. 2 and 5, so that the margins of such plate are flush with the margins of the head to add to the generally stream-lined appearance of the clamp which is one of the distinguishing characteristics thereof made possible by the economical die-cast configurations of the components.

The closure plate is provided with holes at 31 which engaged the reduced terminal ends 24X, FIGS. 4 and 5, of the integrally conformed pivot posts 24, and said ends are peened or headed over as at 33, FIGS. 2, 5, to capture the closure, thus completing the head body and concealing the interiorly disposed components of the adjusting mechanism.

I claim:

1. An adjustable laboratory clamp having structural configurations suited to fabrication by die-casting processes and comprising a cavitateous head structure defined by integrally conformed bottom wall and surrounding side wall portions providing an open face opposite said bottom wall portion, said side wall portions providing a passage therethrough; a pair of tong legs entering said passage and each having an inner end portion disposed in the cavity of the head structure; post members integrally conformed with said bottom wall and having respective free ends terminating substantially at the plane of said open face, said inner end portions of the tong legs each being pivotally captured on one of said post members; spring means acting on said legs to diverge the same; helically-displaced rotary wedge means in said cavity cooperative with said inner ends of the tong legs to converge the same when rotatively displaced in one direction and permitting spring-urged divergence of the legs when rotatively displaced in the opposite direction; closure means for said open face comprising a plate having support on said head structure and at the free ends of said post members; and means at said free ends of the post members securing said plate in position as aforesaid.

2. A clamp structure according to claim 1 further characterized in that said spring means comprises a single compression spring situated entirely within said cavity and having opposite ends seated in sockets formed in said legs.

3. A clamp according to claim 1 wherein said wedge means includes a spindle portion extending through said bottom wall with an inner end disposed in said cavity and a frusto-conical wedge cam at said inner end disposed in wedging relation to said inner ends of the tong legs for helical displacement as aforesaid, the outer end of said spindle being provided with knob means, and helical screw threading on the spindle cooperative with like threading in an integral portion of the bottom wall.

4. The construction of claim 3 further characterized in that said integral portion of the bottom wall comprises an integral protuberance projecting outwardly therefrom and having a bore including said like threading and constituting a screwway for the wedge means.

5. The clamp of claim 1 further characterized in that said means for fixing the closure in position comprises reduced portions of said free ends of the post members which reduced portions are flared at said terminating parts thereof to capture the closure thereon.

6. A clamp structure according to claim 1 further characterized by the provision of a muff mounting stud comprising an integrally conformed part of the head structure and projecting from a side wall portion thereof, said stud being square in configuration and partially screw-threaded with two opposite side faces including conformed configurations constituting continuing lead portions of screw threading while the remaining intervening side faces of the stud are free of such thread configurations, whereby the head structure including said cavitateous body, post members, protuberance for the screwway and said partially-threaded muff stud can be die-cast as an entity.

7. In a clamp of the burette type for laboratory and like usage having a pair of tong legs with cooperative burette jaws, and screw means actuating said legs for opening and closing the jaws, improvements comprising, namely: a head structure for mounting said legs comprising a box having a bottom wall, surrounding side wall portions and an open top confronting said bottom wall, said bottom wall having at least two post members integrally conformed therewith and projecting toward said open top with free end portions terminating substantially in the plane of the top opening, said side wall portions being interrupted to provide passage for said pair of tong legs, the latter having respective inner ends disposed within said head structure and each respectively pivotally engaged with one of said post members; a mounting stud constituting an integrally conformed portion of said head structure projecting from one of said side wall portions; a closure plate interfitting with said head structure at said open top and secured in such interfit by means engaged with said post members; and actuating mechanism housed within the head and operative to pivot said legs and effect opening and closing of the tong jaws and including an operating knob disposed on the outer side of said bottom wall.

8. A clamp of the tongs type for laboratory and like usage and comprising, namely: a block-like head defining a cavity bounded by a principal bottom wall portion confronting an opposite open top area which is closed by a closure plate to provide a principal top wall portion and said principal top and bottom wall portions affording passage therethrough into said cavity for the ends of a pair of tong members, the inner face of the bottom wall being provided with a pair of upstanding posts extending from the bottom wall substantially to the plane of the open top area; a tong member pivotally engaged upon each said post, each tong member having an inner end portion provided within said cavity with a wedging surface confronting the like surface of the other tong member and respectively lying in planes which make an acute angle with the pivot axis through the appertaining post; one of said principal top and bottom wall portions being provided with a screwway the axis of which is parallel with the axes of said posts; an operating screw working in said screwway and having an inner end portion carrying a frusto-conical wedge working between and against said wedging surfaces of the tong members and operative responsive to screw action in one direction to diverge the latter, and in the opposite direction to permit convergence thereof; spring means acting on said tong members to converge the same; and means on said operating screw exteriorly of the head for manual engagement to impart rotary motion thereto.

* * * * *